United States Patent [19]
Lampe et al.

[11] 3,797,314
[45] Mar. 19, 1974

[54] MEANS FOR DETERMINING THE TOP OIL TEMPERATURE IN TRANSFORMERS

[75] Inventors: Wolfgang Lampe; Erich Spicar; Bo-Göran Persson, all of Ludvika, Sweden

[73] Assignee: Allmanna Svenska Elektriska Aktiebolaget, Vasteras, Sweden

[22] Filed: July 10, 1972

[21] Appl. No.: 270,437

[52] U.S. Cl............. 73/350, 73/368.1, 73/368.2, 336/60
[51] Int. Cl. ... G01k 13/02, G01k 5/32, H01f 27/12
[58] Field of Search.............. 73/350, 368.1, 368.2; 336/60

[56] References Cited
UNITED STATES PATENTS

| | | | |
|---|---|---|---|
| 2,388,565 | 11/1945 | Paluev | 336/60 X |
| 2,949,590 | 8/1960 | Edlinger | 336/60 |
| 2,990,443 | 6/1961 | Camilli | 336/60 X |
| 1,835,470 | 12/1931 | Clarke | 73/350 UX |
| 2,374,055 | 4/1945 | Treanor | 73/350 X |
| 2,114,185 | 4/1938 | Havourd et al. | 73/350 |

FOREIGN PATENTS OR APPLICATIONS

| | | | |
|---|---|---|---|
| 10,898/27 | 12/1927 | Australia | 73/350 |
| 323,408 | 1/1930 | Great Britain | 73/350 |
| 349,411 | 3/1922 | Germany | 73/350 |

Primary Examiner—Donald O. Woodiel
Assistant Examiner—Frederick Shoon

[57] ABSTRACT

For determining the highest oil temperature in a transformer, a temperature-sensitive transducer in the form of a hollow closed body is arranged adjacent the point in the upper part of the winding where the oil temperature is assumed to be highest and is connected by a conducting tube to a measuring device located outside the transformer. The transducer and the connecting tube are filled with a liquid having a higher coefficient of expansion than the material of the transducer and a boiling point which is higher than the highest permissible oil temperature. The tube has a volume which is small in relation to the volume of the transducer.

4 Claims, 5 Drawing Figures

3,797,314

MEANS FOR DETERMINING THE TOP OIL TEMPERATURE IN TRANSFORMERS

BACKGROUND OF THE INVENTION

1. Field of the Invention

The invention relates to a means for determining the top oil temperature in transformers.

2. The Prior Art

As is known, the life of a transformer is to a considerable extent dependent on the maximum temperature of the oil and insulation, the so-called top oil temperature and hot-spot-temperature. The ageing, which mainly causes a decrease in the mechanical strength of the insulation and a chemical decomposition of the oil, increases very rapidly if the temperature exceeds a certain value. To a certain extent the electrical strength is also deteriorated due to ageing. The top oil temperature, as the name suggests, is the temperature of the oil at the upper part of a winding where it has passed all the parts emitting heat. The hot-spot-temperature occurs in the spinning paper where this is in contact with the conducting material in the part of the winding where the spinning paper is surrounded by oil having the highest temperature. The spinning paper is the paper insulation with which the conductor is wound. The hot-spot-temperature, as is clear from the name, occurs within relatively limited areas and therefore evades any direct measurement. However, it can be calculated with acceptable accuracy if the top oil temperature is known.

In order to fully appreciate the problem of achieving the desired length of life of a transformer, it is therefore important to be able to determine the top oil temperature occurring therein.

There have been several suggestions for measuring the top oil temperature. According to one, the oil is led from the top of the winding, which is assumed to have the highest temperature, as well as oil which passes the upper parts of the iron core, to a common measuring point for a thermometer. However, there are several factors of uncertainty here. The measuring accuracy is dependent on the oil not being cooled by cooler oil around the tube on its way from the winding to the measuring point. The oil is taken from a single, very limited area of the winding. Local temperature peaks occurring at a different point are not recorded.

It is also known to place a probe containing a liquid having low boiling point in that part of the winding where the highest temperature is expected to occur and to lead the vapour under pressure caused by the temperature in the probe through a conduit to a manometer outside the transformer. These measuring methods also have the drawback that the measuring is performed at a single point in the winding. For this type of measuring system a liquid is used which has a lower temperature than the oil temperature and a pressure therefore prevails in the measuring system which is higher than the oil pressure. If a leakage should occur in the measuring system, the liquid therein would be forced out into the oil and mixed with it, which is undesirable and may jeopardize the insulation. The risks of transformer faults due to such faults in the measuring system increase the higher the transformer voltage is.

SUMMARY OF THE INVENTION

The present invention relates to a means for determining the highest temperature occurring in the oil in transformers with the help of a system comprising a temperature-sensitive transducer in the form of a hollow closed body which is arranged at or in the immediate vicinity of the point in the upper part of a winding where the oil temperature is assumed to be highest, and a connection in the form of a tube from the transducer to a measuring device located outside the transformer. The invention is characterised in that both the transducer and the connecting tube are filled with a liquid having a higher coefficient of cubical expansion that the material of the transducer, that the liquid has a boiling point which is higher than the highest permissible oil temperature and that the tube which connects the transducer and the measuring device has a volume which is small or negligible in relation to the volume of the transducer.

In a system according to the invention the volume of the liquid enclosed in the transducer, and to a certain, substantially negligible extent, also the communication tube, will have a volume which is dependent on the oil temperature at the point where the transducer is located. The change in the volume of the liquid which occurs when temperature changes are transmitted through the connection tube to the measuring device and is registered or indicated by this device. The scale of the measuring device is suitably indicated in temperature degrees. Since the system operates on the principle of measuring the volume of liquid in the transducer corresponding to the oil temperature, there is in principle no overpressure in the measuring system and since the liquid used is preferably transformer oil, any leakage in the measuring system will not involve risks to the insulation of the transformer.

BRIEF DESCRIPTION OF THE DRAWINGS

In the accompanying drawings

DESCRIPTION OF THE PREFERRED EMBODIMENTS

Figure 1:
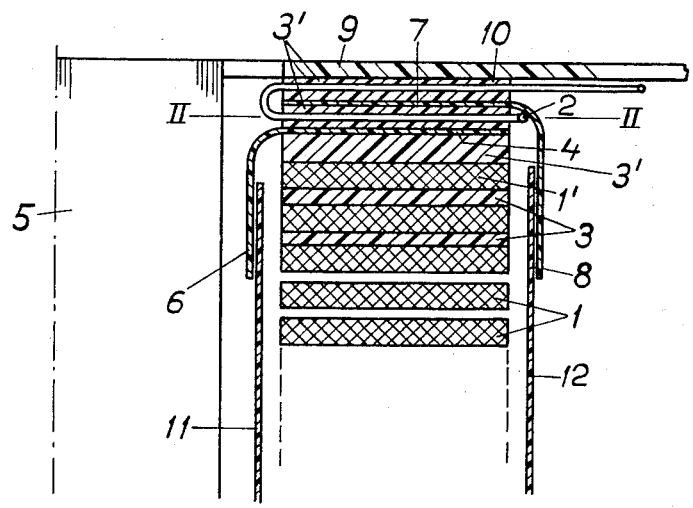
FIG. 1 shows a vertical section through the upper part of a transformer winding which in the example shown and described consists of a plate winding, but the invention is of course suitable for any type of winding.

FIG. 1 shows the upper part of a transformer winding constructed of a number of winding plates 1 placed in known manner one on top of the other and separated by an insulating layer 3 which is directed radially so that the oil can pass between each plate. Above the insulation 3', lying on top of the uppermost winding plate 1', is an annular collar 4 which, on the side facing the core leg 5 or a neighbouring winding, is turned down forming a short ring-like part 6. Above the collar 4 is a number of radially directed spacers 3' and above these a second collar 7 having a ring-like part 8 turned down on the outer side of the winding. Above this second collar 7 is the spacer-ring 9, common to all the windings around a leg, which on its side facing the windings has a number of radially directed bosses 10, so that radially directed oil channels are formed between the spacer-ring and the uppermost collar 7. Between the core leg and the winding is a cylinder 11 which at both ends of the winding abuts as closely as possible the ring-like part 6. A second cylinder 12 is arranged outside the winding and both its end abut as closely as possible ring-like part 8 of the collar 7. Both the collars 4 and 7 and the cylinders 11 and 12 consist of insulating material, for example pressboard, and are primarily intended to reinforce the electrical insulation between the winding and the iron core, but they also form a flow channel for the oil around the winding and the collars form a labyrinth-type guide for the oil at the upper part of the winding. The oil which flows up along the winding, being heated on its way, and which at the upper end of the winding is on the inside of the winding, i.e., to the left of the winding in FIG. 1, is forced by the collar 4 and its tubular part 6 to flow radially outwards between the spacers 3'. At the outer end of the collar 4 this oil meets the oil on the outside of the winding and is mixed with it to form a single oil flow which is forced by the upper collar 7 and its ring-like part 8 to flow inwards towards the centre of the winding, i.e., to the left in the drawing. Here this hot oil, which has been heated by the winding, will be mixed with another oil which may have been in contact with another winding or with the core leg and which may have a different temperature. It is clear from the course described that the hottest oil in the individual winding is where the top oil leaves the winding and before it has been mixed with other oil by the collar system.

Figure 3:
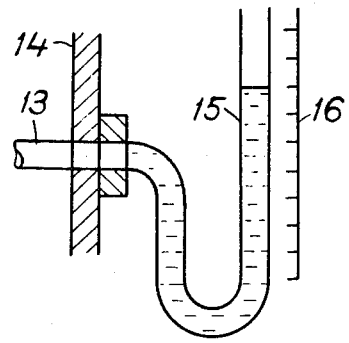
FIGS. 3, 4 and 5 show three variations of the measuring device which can be used in the device.
Figure 4:
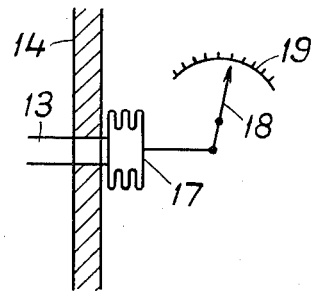
Figure 5:
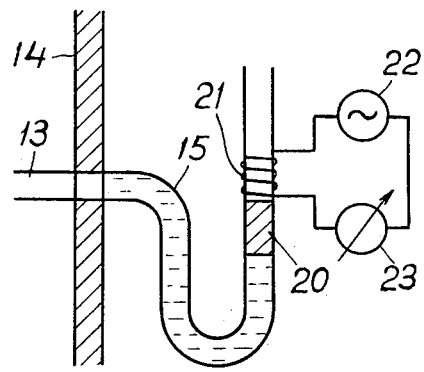

In order to measure the temperature where the oil is hottest, at least one transducer 2 is inserted according to the invention in the area which, according to the above, has the hottest oil. According to FIGS. 1 and 2 the transducer is placed at the upper and outer edge of the upper collar 7. The transducer consists of a tube of electrically insulating material closed at one end. The other end of the transducer is connected by a second tube 13 to a measuring device, preferably located outside the transformer tank 14, as shown in FIGS. 3, 4 or 5. The connection tube 13 leads from the transducer, firstly radially inwardly towards the centre of the winding between two spacers 3'. Inside the winding the tube is bent upwards around the inner edge of the upper collar 7 and is then led radially outwardly from the winding. The connection tube 13 is arranged in this way in order to avoid making holes in the collars 4 and 7 and thus risking a deterioration of the insulating properties of the collars. By placing the transducer radially outside the ends of the spacers 3 it can be given a length almost equal to the outer circumference of the winding. The transducer can also be placed below the lower collar 4 just in the bend where the collar is bent to form the tubular part 6.

Figure 2:
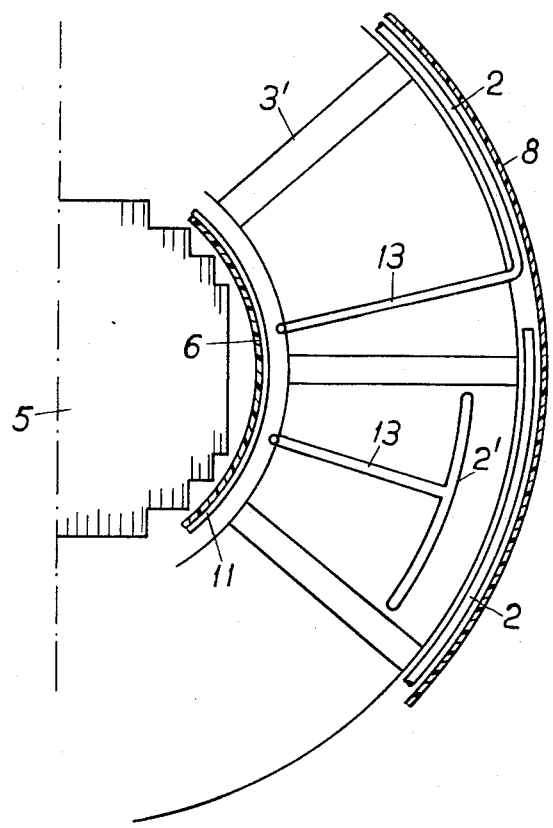
FIG. 2 is a horizontal section along the line II—II in FIG. 1.

Alternatively the transducer may consist of one or more parts which can be placed between two radially directed spacers 3 as shown in FIG. 2 where a transducer part according to this alternative is designated 2'. The parts of the transducer may then be placed either between the uppermost winding plate 1' and the collar 4 or between the collars 4 and 7. In this latter alternative, the transducer may have a different shape from tubular. It may, for example, consist of a circular, flat box or the like.

Both the transducer and the tube been the transducer and the measuring device should have the lowest possible coefficient of thermal expansion. The transducer is completely filled with a liquid which should have the greatest possible coefficient of cubical expansion so that the transducer will be as sensitive as possible. In any case the coefficient of cubical expansion of the liquid should be greater than the coefficient of cubical expansion of the material of the transducer. The boiling point of the liquid should be higher than the highest oil temperature liable to occur so that there will be no vaporization in the system. The liquid enclosed in the transducer must be able to withstand the strong electric field which prevails at the top of the winding. Furthermore, it may not deteriorate the electrical properties of the transformer oil if there should be some fault in the transducer or the tube transmitting the measuring value from the transducer to the measuring device so that the liquid is mixed with the transformer oil. For this reason it is suitable simply to use transformer oil in the transducer. The flow of oil normally occurring in the connection tube is relatively slight and the tube may therefore be given a smaller diameter. Furthermore, the tube is normally led the shortest way to the measuring device outside the transformer. All this means that the liquid volume contained by the tube is small and normally negligible in comparison with the total volume of liquid in the system. This means that even if a part of the tube 13 passes through cooler oil in the transformer the total decrease in volume of the oil in the system caused will be negligible and it may be considered that the alteration in volume of the liquid in the system measured by the measuring device is a direct measurement of the oil temperature at the point where the transducer is located. The transducer functions so that when the temperature increases the liquid expands. The increase in volume is reproduced through the tube 13 to the measuring device. According to FIG. 3, the measuring device consists a U-shaped tube 15 in combination with a scale 16 divided into temperature degrees. According to FIG. 4 the tube 13 ends in a bellows 17 which is joined to an indicator 18 which indicates the temperature on a scale 19. FIG. 5 shows yet another embodiment of the measuring device. Above the level of the liquid is a body 20 of magnetic material. A winding 21 surrounds the tube 15 and is connected in series with a current source 22, for example a high-frequency generator and a measuring instrument 23. When the body 20 enters the magnetic field of the winding, the reactance of the winding changes and the instrument gives an indication. Possibly the measuring device according to FIG. 3 may be combined with the device in FIG. 5, in which case the latter device can be used as an alarm device if the temperature rises above a certain value which is determined by the position of the winding 21. The device can also be used to control connection and disconnection of the cooling means of the transformer. Other types of pressure-sensitive instruments can be used, for example, those operating with a Bourdon tube. In practice it must be taken into consideration that both the transducer and the tube 13 expand somewhat and furthermore that the liquid in the tube 13 has a slightly lower temperature than the liquid in the transducer. The measuring device must therefore be calibrated taking this into consideration.

The transducer 2 with supply tube 13 is inserted when the winding is manufactured and cannot be removed afterwards. However, since both parts consist of insulating material and are filled with a liquid which withstands the electric field they will not affect the qualities of the transformer.

For an accurate measuring in the heat test to be performed as a check before delivery, a thermoelement can be inserted through the connection tube 13 and the tubular transducer. The thermoelement will then be located at the point where the oil temperature is highest. Since the heat test is performed with a short-circuited transformer, the voltages will be so low that the metallic thermoelement can be inserted without risk during the test. However, it is quite impossible to have this metallic object as a measuring device during operation. The thermoelement can be used as calibrating instrument for the measuring devices to be used during operation.

We claim:

1. Means for determining the highest oil temperature in transformers with the help of a system comprising a temperature-sensitive transducer in the form of a hollow closed body which is arranged adjacent the point in the upper part of a winding where the oil temperature is assumed to be highest, a measuring device located outside the transformer, and a tube connecting the transducer to the measuring device the transducer 2,2' and the connecting tube 13 being filled with a liquid having a higher coefficient of cubical expansion than the material of the transducer and a boiling point which is higher than the highest permissible oil temperature, the tube having a volume which is small in relation to the volume of the transducer, the transformer having a plurality of collars 4,7 and spacers 3 which guide the oil flow at the upper end of the winding, the transducer being located within said collars and spacers.

2. Means according to claim 1, in which the liquid consists essentially of transformer oil.

3. Means according to claim 1, in which the transducer comprises a second tube, closed at one end, which is bent and is located in the path of the oil which has passed the winding, and the other end of the second tube is connected to the connecting tube 13.

4. Means according to claim 1, in which the transducer comprises a number of part-transducers 2 connected in parallel to the connecting tube 13.

* * * * *

UNITED STATES PATENT OFFICE
CERTIFICATE OF CORRECTION

Patent No. 3,797,314    Dated March 19, 1974

Inventor(s) Wolfgang Lampe et al.

It is certified that error appears in the above-identified patent and that said Letters Patent are hereby corrected as shown below:

On the cover sheet insert

-- [30] Foreign Application Priority Data

Sweden    July 22, 1971    9404/71    --.

Signed and sealed this 10th day of September 1974.

(SEAL)
Attest:

McCOY M. GIBSON, JR.　　　　　　　　　C. MARSHALL DANN
Attesting Officer　　　　　　　　　　　Commissioner of Patents